United States Patent [19]

Voyles et al.

[11] 4,016,464
[45] Apr. 5, 1977

[54] ANODE RISER MEANS FOR A CAPACITOR

[75] Inventors: Gerald A. Voyles; Paul S. Deak, both of Indianapolis, Ind.

[73] Assignee: P. R. Mallory & Co., Inc., Indianapolis, Ind.

[22] Filed: Apr. 5, 1976

[21] Appl. No.: 674,203

Related U.S. Application Data

[63] Continuation of Ser. No. 502,201, Aug. 30, 1974, abandoned.

[52] U.S. Cl. .............................. 361/433; 174/52 S
[51] Int. Cl.² .......................................... H01G 9/00
[58] Field of Search .................... 317/230; 174/52.5

[56] References Cited

UNITED STATES PATENTS

| | | |
|---|---|---|
| 3,275,901 | 9/1966 | Merritt et al. ..................... 317/230 |
| 3,487,270 | 12/1969 | Alwitt ................................ 317/230 |
| 3,612,957 | 10/1971 | Steigerwald ....................... 317/230 |

*Primary Examiner*—Michael J. Lynch
*Assistant Examiner*—Joseph E. Clawson, Jr.
*Attorney, Agent, or Firm*—Hoffmann, Meyer & Coles

[57] ABSTRACT

A porous dielectric oxide film-forming metal anode capacitor is provided with an anode riser means that is able to absorb energy by deforming or flexing when subjected to compressive forces such as the forces resulting from a crimping operation in the construction of the capacitor. The anode riser means comprises one or more continuous lengths of metal with at least a portion of one of the lengths in the shape of a bight.

5 Claims, 3 Drawing Figures

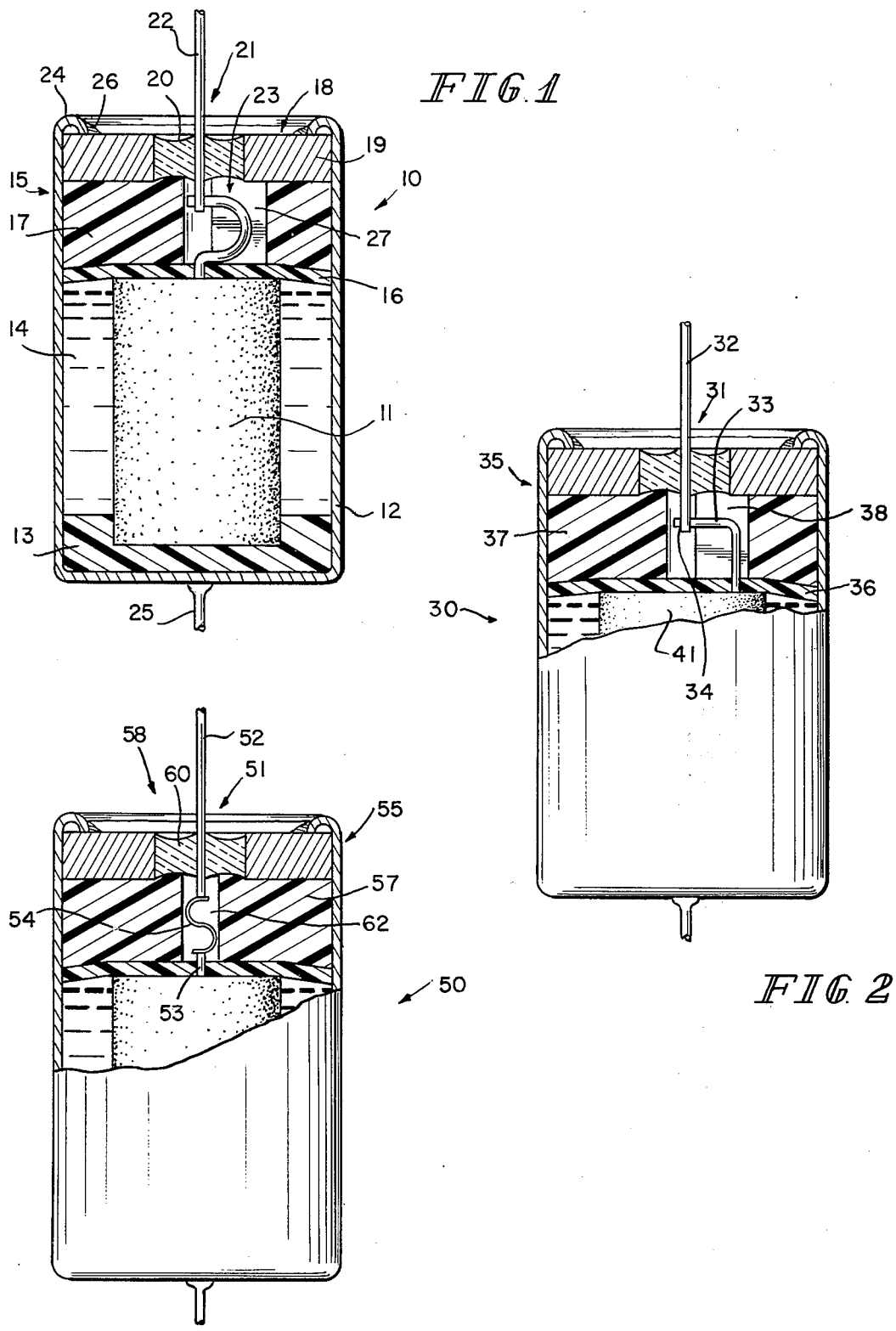

ANODE RISER MEANS FOR A CAPACITOR

This is a continuation of application Ser. No. 502,201, filed Aug. 30, 1974, now abandoned.

The present invention relates to electrical devices and more particularly, to porous dielectric oxide film-forming metal anode capacitors utilizing a liquid or semi-liquid electrolyte.

Porous dielectric oxide film-forming metal anode electrolytic capacitors have gained wide acceptance in the electronics industry because of their excellent performance characteristics and particularly because of the high capacitance-voltage per unit of volume of such devices. These devices generally comprise a porous sintered dielectric oxide film-forming metal anode body, a metal lead wire or riser embedded in the anode body and extending therefrom, a dielectric oxide film over the anode body, a liquid or semi-liquid electrolyte contacting the oxide film or the anode body and acting as a cathode for the capacitor, a metallic housing or can containing the electrolyte and the anode and in electrical contact with the electrolyte, and an electrically insulative rigid end seal assembly closing an open end of the housing, the anode riser projecting through or in electrical contact with the end seal assembly. Typically, the anode riser is composed of the same metal as is used in the anode since the riser must be protected from electrical contact with the electrolyte and this end can be accomplished by forming a dielectric oxide film over the anode riser. External electrical contact to the cathode is made by a metal lead attached to the housing.

Dielectric oxide film-forming metals typically used to make a porous anode for this type of capacitor are tantalum, niobium and titanium. Tantalum is the most widely used metal of the three because of generally more favorable electrical properties.

The end seal assembly of the housing has three primary functions, one, to electrically insulate the anode riser from the metallic housing, two, to prevent the leakage or loss of the electrolyte from the capacitor during normal operating conditions, and three, to help maintain the anode body in a fixed position relative to the housing so that the capacitor is able to withstand vibrational energy without harmful effects.

To fulfill the third function, the end seal assembly is usually forced against the top of the anode body by crimping the open end of the metal housing over the end seal assembly. The amount of force utilized in crimping is fairly critical as not enough force will result in capacitor that may not withstand vibrational energy or may not retain electrolyte, and too much force may result in harmful stresses on the anode or the anode riser. Unfortunately, the amount of force used in the crimping operation is difficult to accurately control, especially in small capacitors, and as a consequence, many capacitors are overcrimped, that is, excess compressive forces are utilized to close the housing. The forces associated with such an overcrimping may cause damage to the anode riser since the riser is fixed at both ends, one end at the anode body and another in the end seal assembly. These forces may cause buckling of the riser and breaks in the dielectric oxide layer of the anode riser which may allow electrolyte to contact bare tantalum metal and thereby cause a high leakage current, or even a short, when the capacitor is in operation.

Even if the anode riser itself is not damaged by the excess crimping forces, the integrity of the bond between the riser and the end seat assembly may be harmfully affected by the compressive forces thereby allowing a means for the loss of electrolyte and the ingress of harmful contaminants. The electrical connection between the anode body and the anode riser may also be harmfully affected by the excess compressive forces due to loosening of the mechanical connection between the two components.

It is therefore a feature of the present invention to reduce compressive stresses experienced by the anode riser of a capacitor due to engaging the seal with the housing are reduced. Another feature of the invention is that the harmful effect of excess crimping forces is reduced. Yet another feature of the invention is that assembly of a tantalum electrolytic capacitor is simplified.

These and various other features of this invention as well as many specific advantages will become more fully apparent from a detailed consideration of the remainder of this disclosure including the accompanying drawings, in which;

FIG. 1 is a cross-sectional view of one embodiment of the construction of a capacitor according to this invention.

FIG. 2 is a cross-sectional view of another embodiment of the construction of a capacitor according to this invention.

FIG. 3 is a cross-sectional view of yet another embodiment of construction of a capacitor according to this invention.

Generally, the present invention comprehends a deformable or flexible anode riser means cooperatively associated with a porous dielectric oxide film-forming metal anode electrolytic capacitor to help minimize compressive stresses caused by the housing engaging the seal of the capacitor such as experienced in a crimping operation on the housing. More specifically, the present invention relates to an anode riser means capable of absorbing energy having two distal ends and comprising one or more continuous lengths of metal and at least a portion of one length in the shape of a bight, the first distal end of the anode riser means in electrical contact with the anode and the second distal end providing means for external electrical termination of the anode means. The shape of a bight can be defined as one or more bends or curves in an object such as loops, semi-loops, C-shapes, S-shapes, acute or obtuse angles and the like. Thus the anode riser means has at least a portion of its length having one or more curves and/or angles which can be contrasted to a linear, axial anode riser means. An anode riser means in this configuration is thereby able to flex or deform and thereby absorb energy when the anode riser is under stress and therefore helps to prevent damage to the capacitor during construction, especially during the crimping operation. The particular shape of the anode riser means is not critical, just so long as it is able to flex or deform under compressive forces, is readily manufactured, and is compatible with the end seal assembly.

The concept of the invention can be more clearly understood with reference to the accompanying drawing. FIG. 1 illustrates one embodiment of the invention in a cross-sectional view of an electrolytic tantalum capacitor 10. Capacitor 10 comprises a sintered porous tantalum anode 11 partially retained in a rigid metallic housing 12 by insulative bottom cup 13. A liquid or semi-liquid electrolyte 14 is contained in the housing 12 and contacts anode 11. Connection to the cathodic side of the capacitor 10 is accomplished by cathode connection 25 which is in electrical contact with the housing 12. End seal assembly 15 comprises a elastomeric disc 16, an elastomeric end plug 17 and a rigid seal 18 of the glass-to-metal type. The metal portion 19 of the seal 18 is attached to the housing 12 and glass portion 20 of the seal is around a part of the anode riser means 21. Anode riser means 21 is composed of the terminal or feed-through portion 22 attached to the energy absorbing portion 23 which is in the shape of a bight. In this embodiment, the energy absorbing portion 23 of the anode riser means 21 is generally C-shaped. In the construction of the capacitor 10, the energy absorbing portion 23 will help relieve stresses on the anode riser means 21 as the edges 24 of the housing 12 are crimped over the glass-to-metal seal 18. To complete construction of capacitor 10, the edges 24 of the housing 12 are joined by methods such as soldering or welding to the metal 19 of the seal 18 by joint 26.

To facilitate the construction of the end seal assembly 15, the elastometric plug 17 and/or the elastomeric disc 16 may contain a slit or aperture 27 so that these components can be easily placed in their proper position around the anode riser means 21, especially the energy absorbing portion 23.

It should be understood that the various components of the capacitor 10 as shown are given for illustrative purposes only and the invention as described is not limited to this particular combination of components. For example, the rigid seal may be a glass-to-metal-to-ceramic seal, a ceramic-to-metal-seal, a thermoplastic seal, a thermosetting seal or the like. Also, the porous anode may be composed of other film-forming metals such as niobium or titanium.

FIG. 2 illustrates another embodiment of an anode riser means which is able to absorb the compressive forces of crimping without substantial adverse effect. Capacitor 30 contains the same components as shown in FIG. 1 except that the anode riser means is of a different configuration. Anode riser means 31 is composed of terminal or feed-through portion 32 and energy-absorbing portion 33 fastened together at point 34 to provide good electrical contact. One part of energy absorbing portion 33 is embedded in anode 41, offset from the vertical axis of the anode and the other part of the energy absorbing portion contains an approximate right angle bend thereby allowing for a certain amount of deflection during the crimping operation. Again the elastomeric plug 37 and/or the elastomeric disc 36 may be provided with a slit or aperture 38 to facilitate the construction of the end seal assembly 35.

FIG. 3 illustrates yet another embodiment of an anode riser means in a tantalum capacitor according to this invention. Again, capacitor 50 contains the same components as shown in FIG. 1 except for the anode riser means. Here anode riser means 51 comprises a terminal or feed-through portion 52 with the glass 60 of the glass-to-metal seal 58 around it, anode portion 53 partially embedded in the anode, and connecting or energy absorbing portion 54 substantially S-shaped suitably affixed to the terminal portion and the anode portion by means such as welding. Again the elastomeric plug 57 of the end seal assembly 55 may contain a slit or aperture 62 to facilitate construction of the capacitor 50.

The embodiments of an anode riser means according to this invention as shown in the drawing are given for purposes of illustration only and are not intended to limit the scope of the invention. The skilled practitioner in the art, aware of the concepts of this invention, could conceive many alternate structures or configurations that are not here shown which could perform the functions required equally as well.

Thus the invention as has heretofore been described comprehends an anode riser means structure which is able to withstand harmful compressive forces generated during the crimping operation in the construction of an electrolytic dielectric oxide film-forming metal anode capacitor. The anode riser means structure comprises at lease one continuous length of metal with a substantial portion of the riser means in the shape of a bight which allows the riser means to absorb at least some potentially harmful compressive forces.

While the present invention has been described with reference to particular embodiments thereof, it will be understood that numerous modifications may be made by those skilled in the art without actually departing from the spirit and scope of the invention as defined in the appended claims.

We claim:
1. A capcitor comprising a housing having an open end, a sintered dielectric oxide film-forming metal anode means having a myriad of intercommunicating voids, a liquid type electrolyte contacting the anode means, rigid means closing the open end of the housing and edges of the housing compressively acting on the rigid means and thereby on the anode means, resilient means interposed between the anode means and the rigid means, surfaces of the resilient means contacting the anode means and the rigid means to help maintain the anode means in the fixed spatial relationship relative to the housing, and anode riser means capable of absorbing compressive forces projecting through the resilient means, the anode riser means having two distal ends and comprising at least one continuous length of metal and at least a portion of at least one length in the shape of a bight, the first distal end of the anode riser means in electrical contact with the anode means and the second distal end providing means for external termination of the anode means.

2. The capacitor of claim 1, wherein the anode riser means has a substantially C-shaped portion.

3. The capacitor of claim 1, wherein the anode riser means has a substantially S-shaped portion.

4. The capacitor of claim 1, wherein the anode riser means contains two lengths of metal connected together and forming at least two substantially right angles.

5. The capacitor of claim 1, wherein the anode riser means contains three lengths of metal connected together, an intermediate length forming angles with two other lengths.

* * * * *